Aug. 18, 1970  C. P. COUGHLIN ET AL  3,524,953
OBJECT PRESENCE SENSOR
Filed March 18, 1968  9 Sheets-Sheet 5

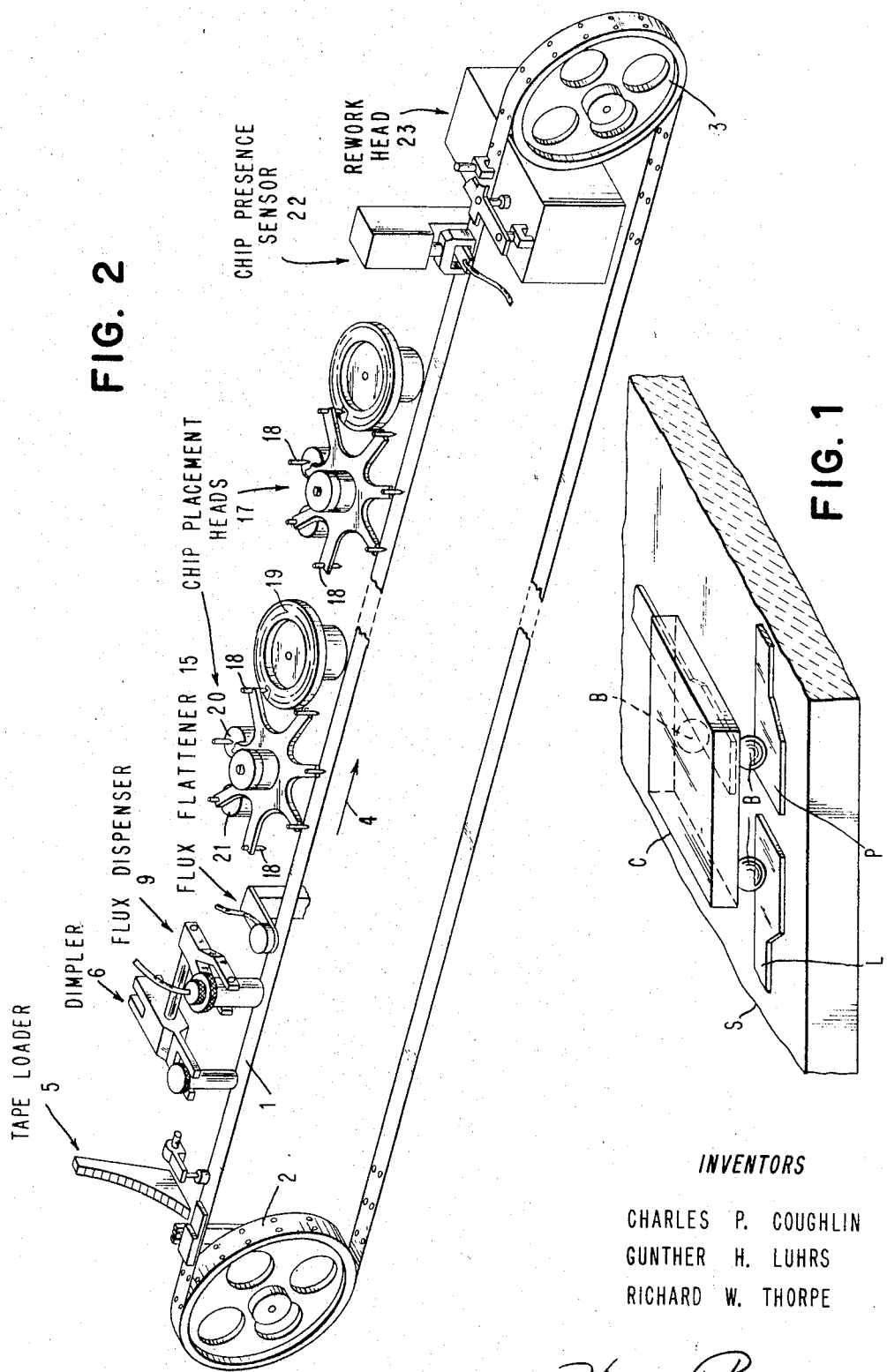

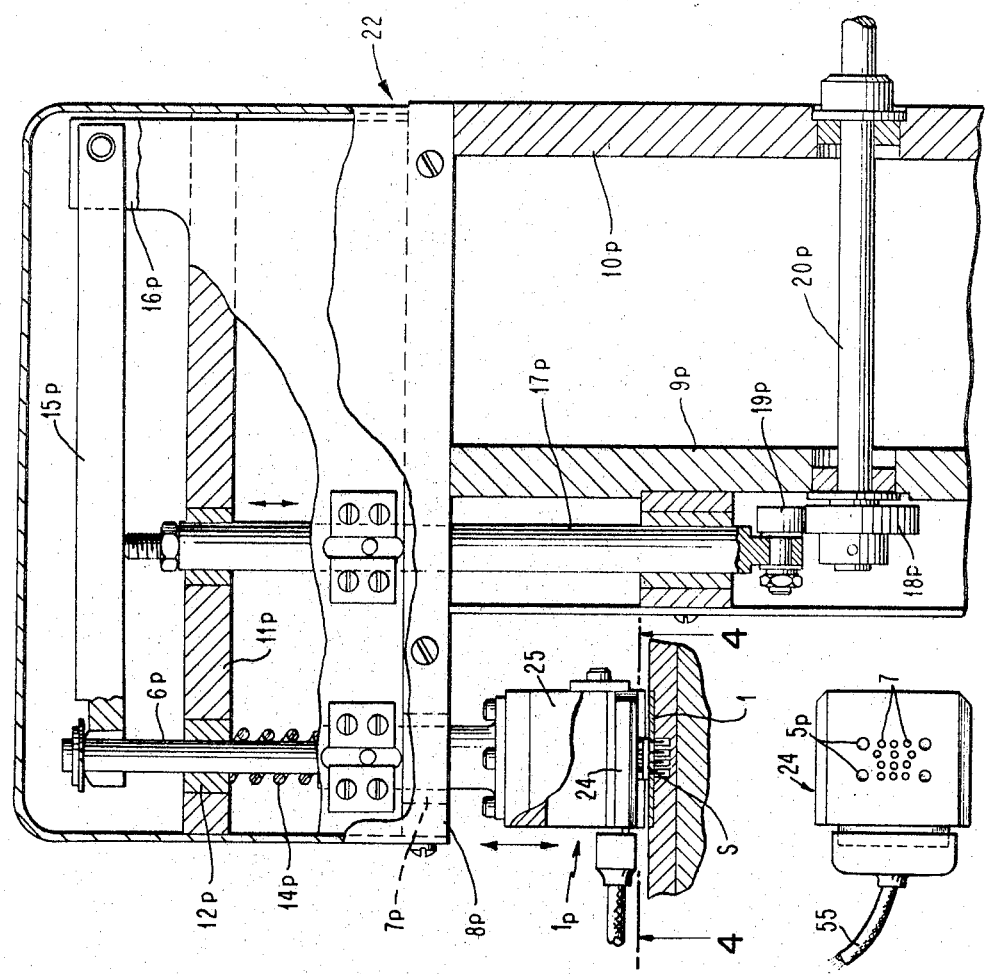
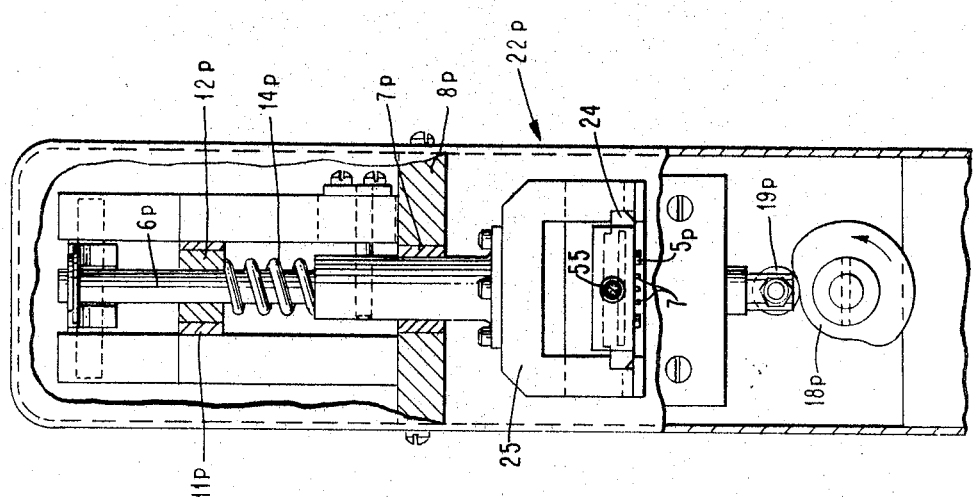

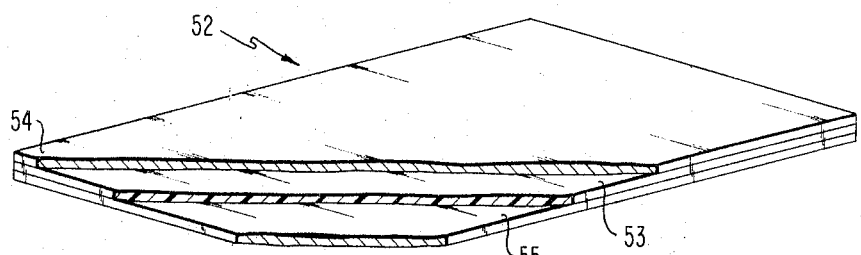
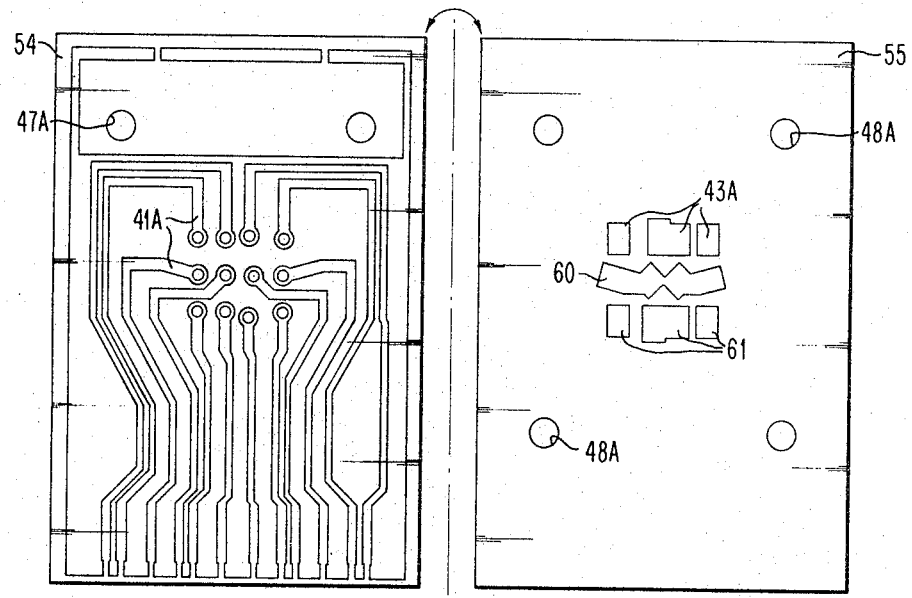
FIG. 8
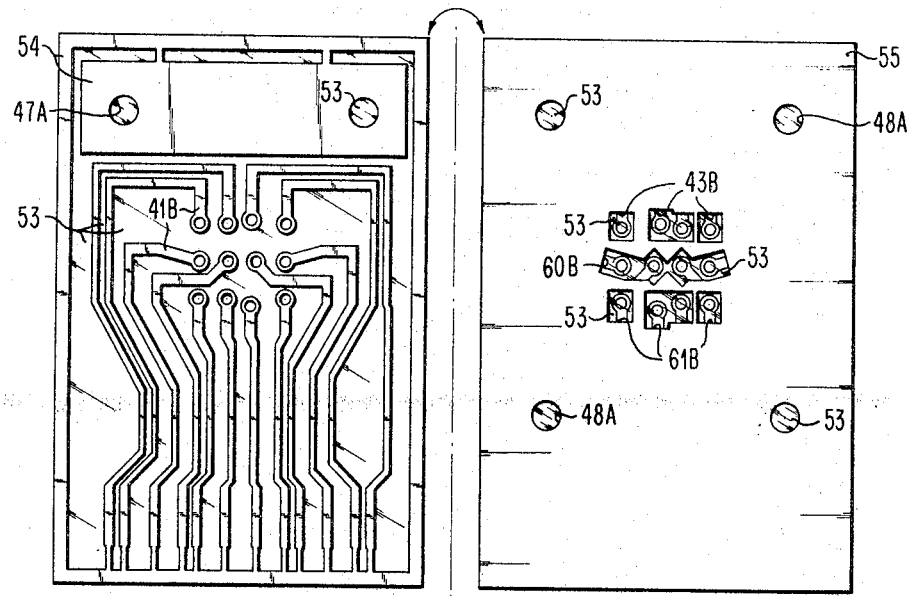
FIG. 9A
FIG. 9B

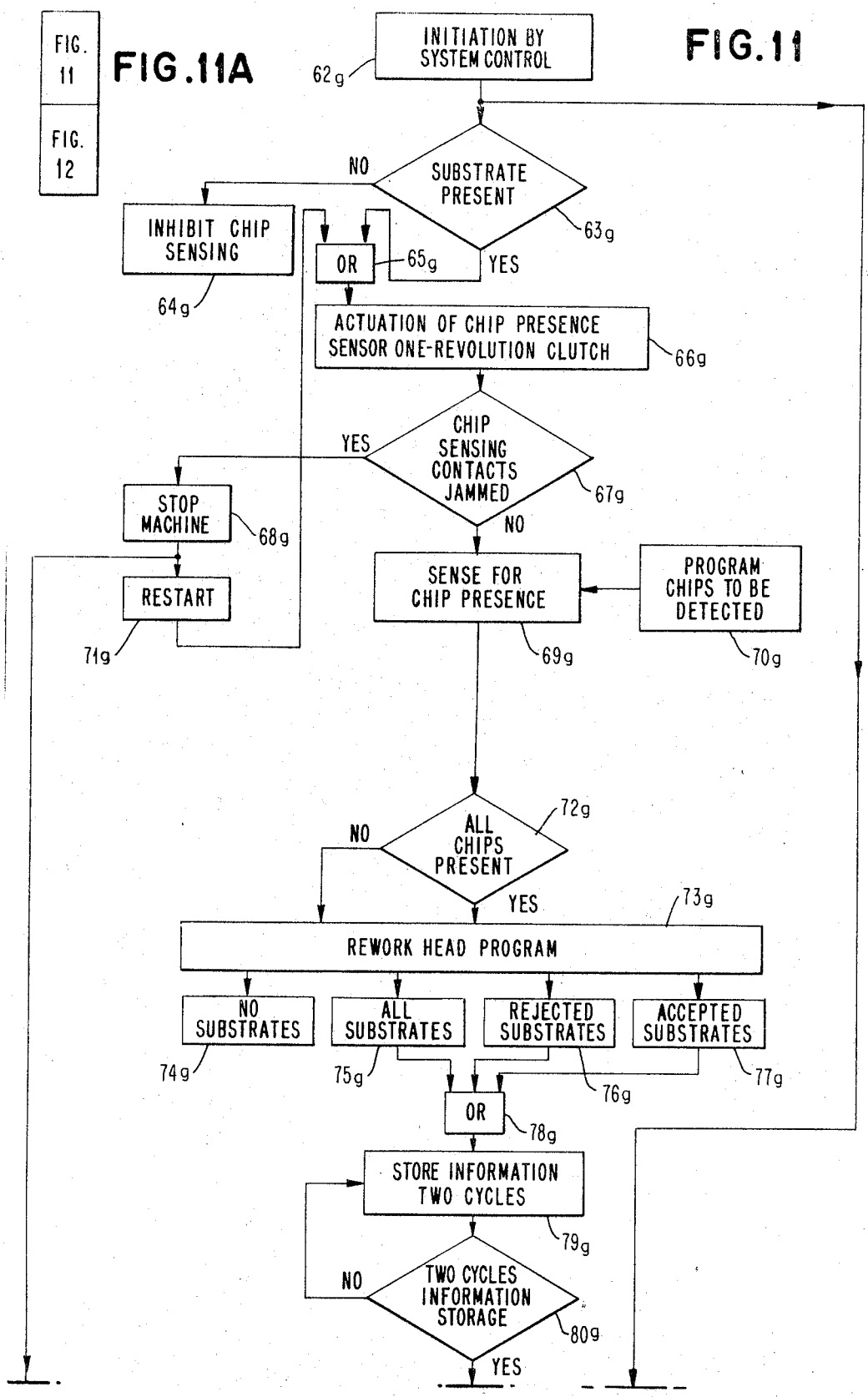

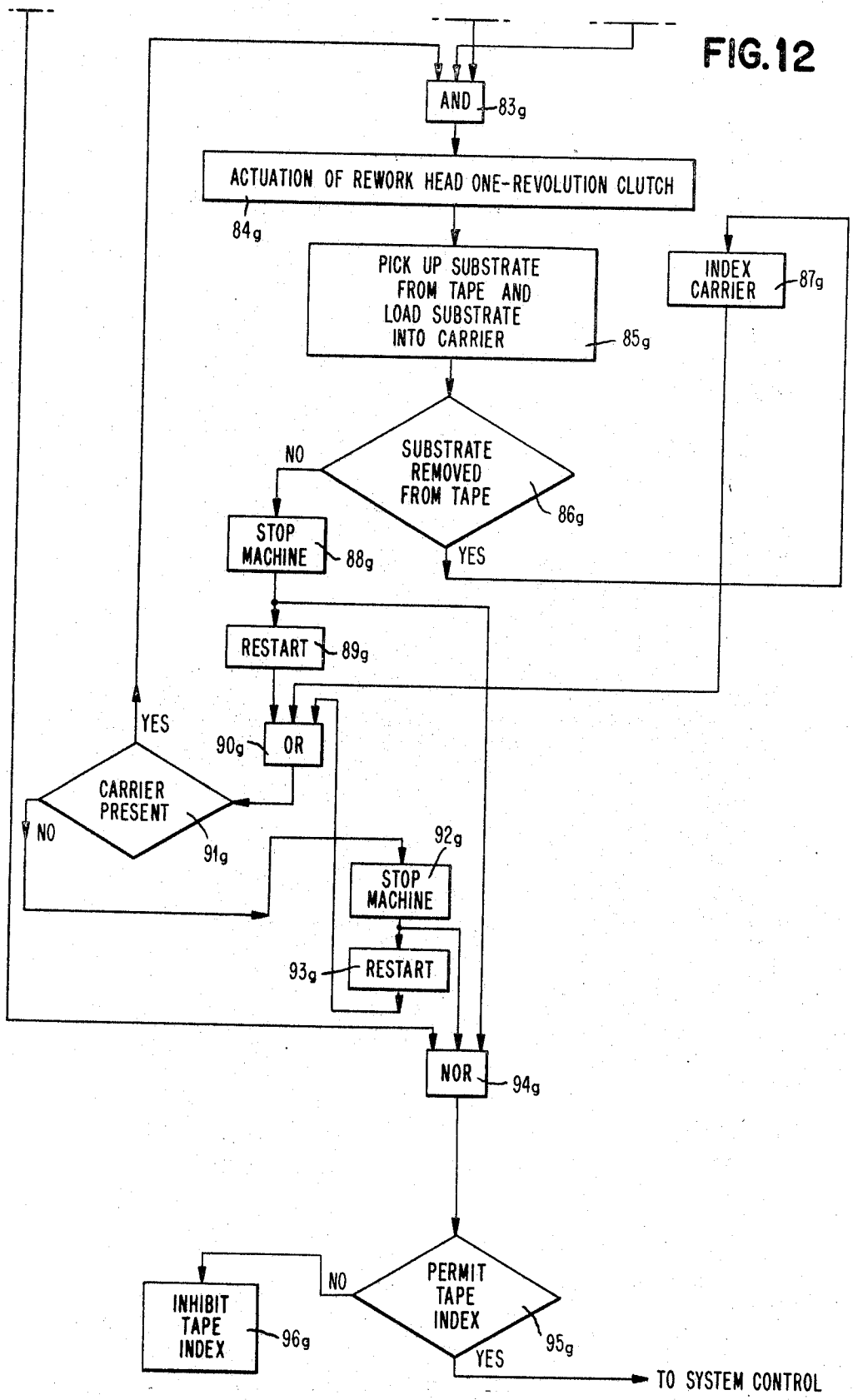

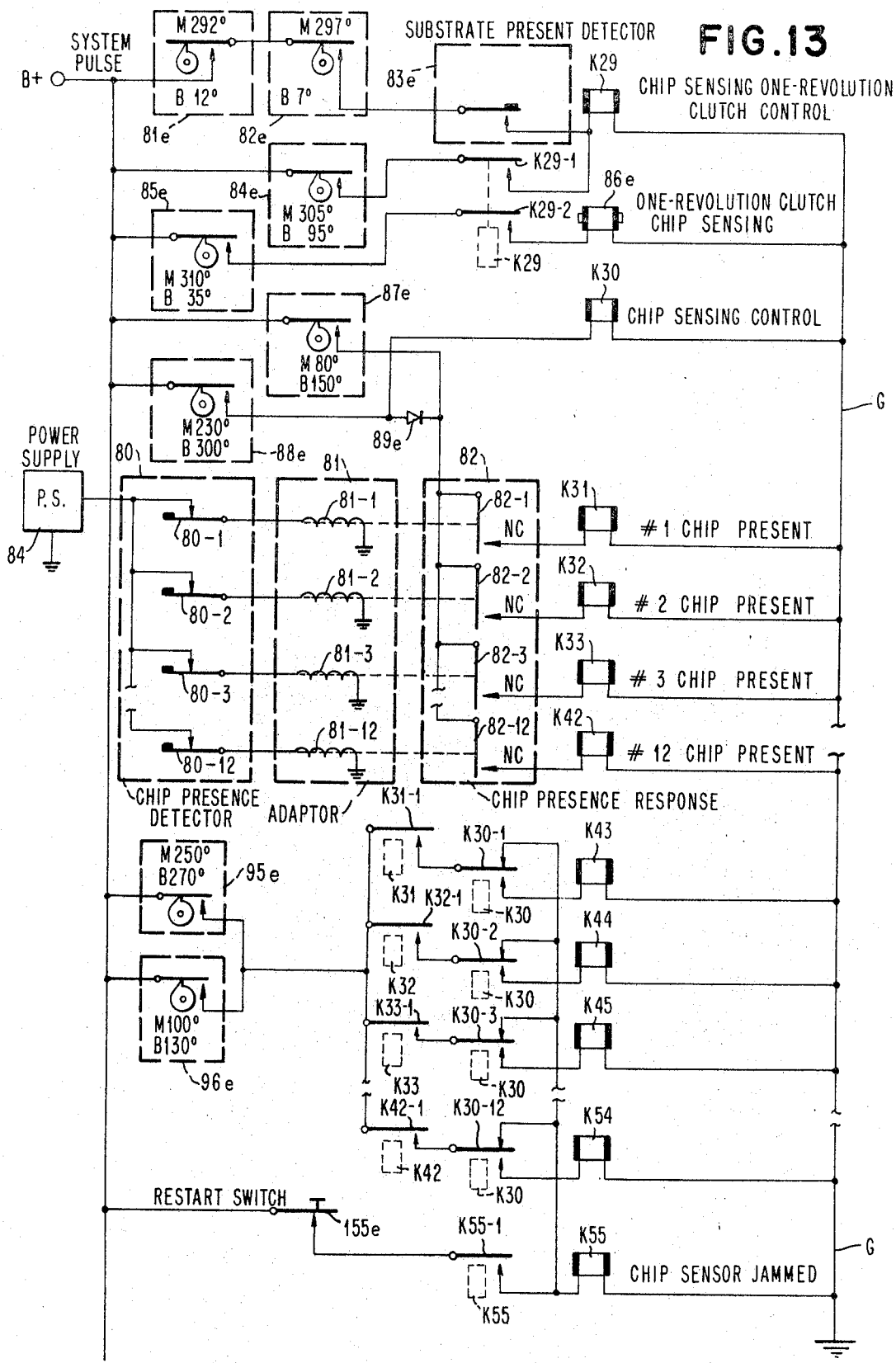

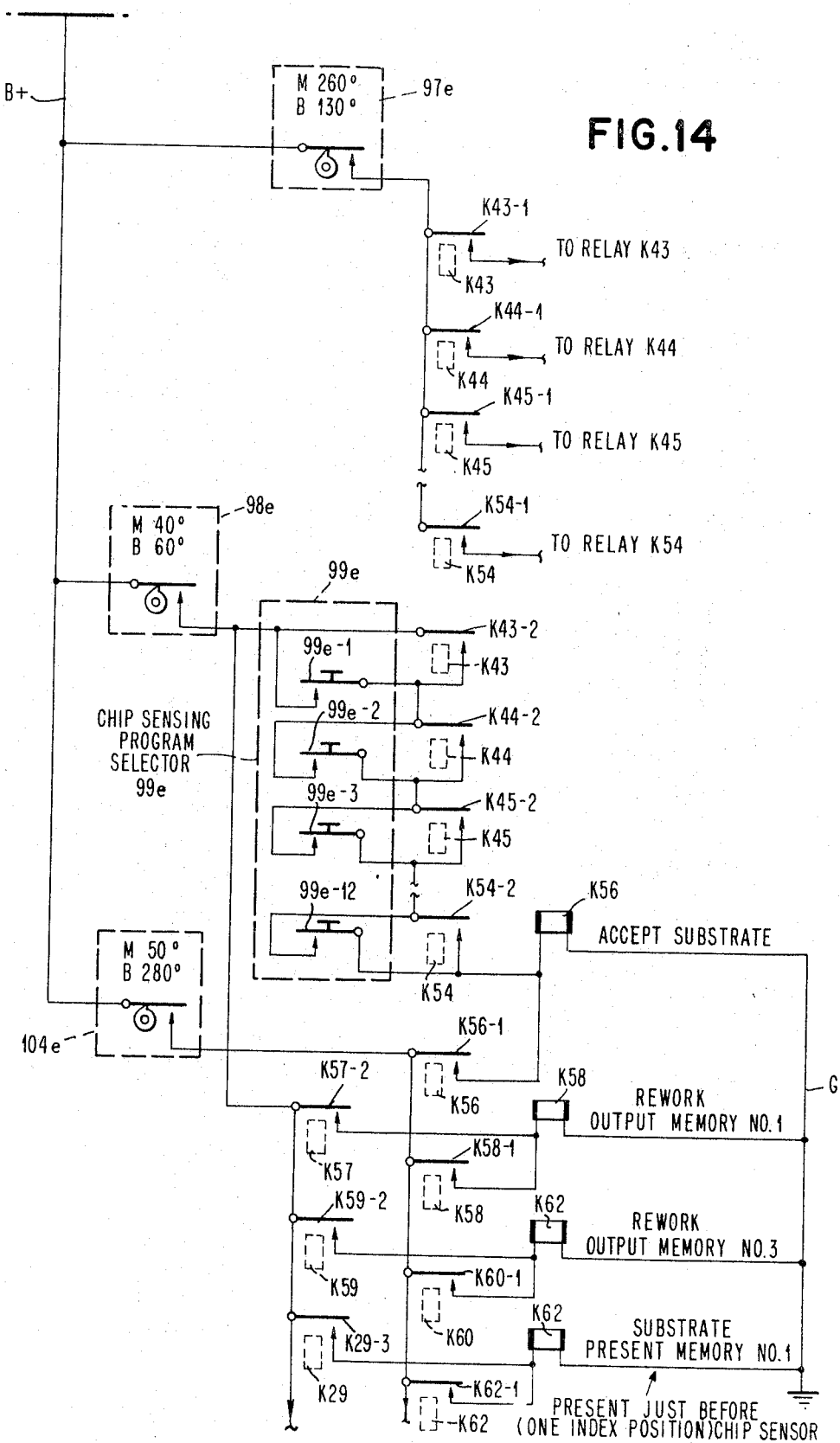

United States Patent Office 3,524,953
Patented Aug. 18, 1970

3,524,953
OBJECT PRESENCE SENSOR
Charles P. Coughlin, Chelsea, Gunther H. Luhrs, Hopewell Junction, and Richard W. Thorpe, Poughkeepsie, N.Y., assignors to International Business Machines Corporation, Armonk, N.Y., a corporation of New York
Filed Mar. 18, 1968, Ser. No. 713,929
Int. Cl. B32b 31/14; H01h 3/16
U.S. Cl. 200—61.42     19 Claims

ABSTRACT OF THE DISCLOSURE

A presence sensor in which a projecting probe is operatively disposed to position the end thereof opposite and below the top of an object to be sensed, and whose presence depresses the probe which, in turn, opens normally closed contacts of a sensing circuit. The switch contacts employed are of a planar laminated construction in which two planar contacts of conductive spring stock are separated by a sheet of insulating material. The laminate is contained in the head of a sensor together with sensing pins or probes which are biased into projection from the head, and to normally force the free ends of the spaced apart portions of the contacts yieldingly closed against each other.

As the head is brought down, the ends of the probes are disposed at a level which normally would be below the top of an object to be sensed. When the object is present, the probe is depressed to open the normally closed contacts of the laminate to provide an appropriate signal thereof. Contacts which remain closed indicate the absence of the object.

BACKGROUND OF THE INVENTION

This invention relates to probes for sensing the presence of objects, and more particularly to a probe employed at a sensing station to detect the presence of components mounted on a workpiece travelling past the station. More specifically, the invention relates to means for sensing the presence of a pattern of semiconductor chips mounted, in a high speed production line, onto printed circuit substrates.

DESCRIPTION OF THE PRIOR ART

In an automated high speed production line, it is necessary that various workpieces and the various operations performed thereon be carried on in a reliable manner in order to obtain a consistent output. To this end, various controls are employed at appropriate sensing stations to determine if a workpiece conforms to the condition or status required for it, as it progresses through the production line. In one exemple, such controls may be employed in applications such as described in U.S. Letters Pat. No. 2,863,579 to sense the presence of obstruction in containers for rejection thereof in the event of such obstruction. In other applications, such controls may be used on automated assembly lines to insure that a desired unification of components was in fact accomplished at preceding work stations in the assembly line.

Of particular interest for the application of invention is the assurance of reliability in the automated assembly line described in U.S. application Ser. No. 459,179, filed May 27, 1965, and assigned to the assignee of this application. More particularly this prior application, whose teachings are incorporated herein by reference thereto, discloses a high-speed high-yield automated assembly line for mounting of semiconductor chips on printed-circuit substrates. In general, the printed-circuit substrates are first automatically loaded onto an endless conveyor tape which carries the substrates sequentially through a number of chip positioning and mounting stations at each of which semiconductor chips are mounted as required on the substrates in predetermined orientation and placement.

After the last chip positioning station, the substrate passes through a chip presence sensing device which detects whether all chips are properly positioned and present in the desired pattern on the substrate. Any substrates which do not pass this test are then automatically removed from the conveyor tape by a rework head so that only good substrates arrive at the discharge end of the latter.

One successful approach for sensing the presence of a desired pattern of chips is described in copending application U.S. Ser. No. 459,382, filed May 27, 1965, now Pat. No. 3,410,401 issued Nov. 12, 1968, and assigned to the same assignee as the present invention. As disclosed in this application, a reciprocal sensing head is mounted above the conveyor directly over the indexed position of the substrate in its progress through the line. The sensing head is provided with a plurality of longitudinally reciprocal protruding pins or probes which are arranged in the same relative locations as the chips on the substrate. Contained within the head assembly are a plurality of discrete electrical switches associated with the pins or probes, which switches or probes are closed when the pin or probe is depressed by abutment with a chip as the head is lowered for the sensing operation. Appropriate electrical circuitry is then provided to detect, via the electrical switches associated with the pins, whether or not all the chips are present.

SUMMARY OF THE INVENTION

It has now been discovered in accordance with the invention, that the capability and precision of the chip presence sensor of the aforesaid application Ser. No. 459,179 can be improved by replacement of the cluster of discrete chip sensing switch assemblies therein with a novel switch structure of this invention which assimilates the cluster of discrete switches into a unitary planar laminated construction. In the preferred form, the switch structure assembly of this invention comprises a printed-circuit board construction whose fabrication adapts conventional photolithographic techniques to thus enable the use of art work which can be produced within ±0.0005 of an inch. Also, in such a printed-circuit board construction, a higher density of switches can be employed which can be positioned with increased accuracy for sensing a desired pattern of chips, which for purposes of illustration can be located on center-to-center distances of the order of 0.050 inch or less.

Accordingly, it is an object of this invention to provide a novel and improved probe means for sensing the presence of an object.

Another object of this invention is to provide a novel and improved method for actuation of a plurality of electrical switches integrated in a printed-circuit board construction for use in conjunction with electrical sensing circuits.

A further object of this invention is to provide a novel probe means for sensing the presence of objects which incorporates a plurality of switches in an integrated planar laminated construction for use in conjunction with electrical sensing circuits.

The foregoing and other objects, features, and advantages of the invention will be more apparent from the following more particular description of the preferred embodiment of the invention, as illustrated in the accompanying drawings.

BRIEF DESCRIPTION OF THE DRAWINGS

FIG. 1 is a schematic perspective view of a portion of a printed-circuit substrate with a semiconductor chip in position upon a set of land pads thereof;

FIG. 2 is a schematic perspective view of a chip positioning assembly line representing an environment in which the probe means of this invention is comprehended for use;

FIG. 3 is a side elevational view in broken section of a chip presence sensing head incorporating the probe means of this invention;

FIG. 4 is a bottom view of the sensing head shown in the side elevation of FIG. 3;

FIG. 5 is a front elevational view in cross section of the chip presence sensor head shown in FIG. 3;

FIGS. 8 to 9F illustrate the various stages in the manufacturing of the printed-circuit component of the switch assembly shown in FIG. 6;

FIGS. 11 to 12 are logic flow diagrams showing the sequence of operations and logical functions performed by an electrical control system; and FIGS. 13 to 14 inclusive are electrical circuit diagrams showing electrical control systems employed in conjunction with the subject invention.

DESCRIPTION OF THE PREFERRED EMBODIMENTS

The environment

Figure 6:
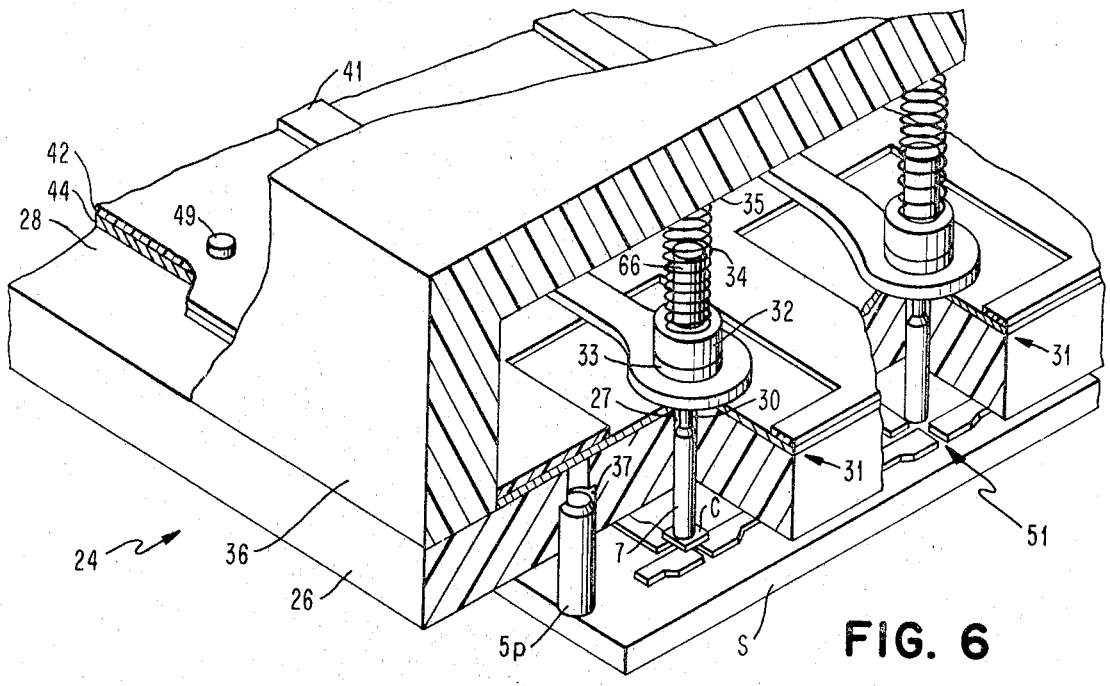
FIG. 6 is a fragmentary view partly in section showing details of the chip presence sensor head of FIG. 3.

In order to more fully describe and provide a better understanding of the probe sensing means of this invention, it will be described in conjunction with the automated assembly line of the above identified and incorporated U.S. application Ser. No. 459,179 designed for mounting of semiconductor chips on printed-circuit substrates.

The general nature of the structure and overall mode of operation of this mounting line will be first described, after which the specific structure of the chip presence sensor will be described in more detail.

Referring first to FIG. 1 which shows the end product of the machine, as chip C is assembled onto a substrate with three contact balls with the chip resting upon the enlarged pads P of the conductive lands L formed on the upper surface of substrate S and constituting the printed-circuit pattern. However, it is to be understood, that although for purposes of illustration, the semiconductor chips are shown as being of the type wherein each chip constitutes a single diode or transistor, the subject invention may also be utilized to position chips of the type wherein each constitutes a monolithic integrated circuit comprising a plurality of diodes and/or transistors as well as other circuit components together with conductive lands interconnecting same. Furthermore, as indicated above, the subject invention finds ready utility in other manufacturing operation or in other assembly operation where it is desired to position one or more smaller workpieces at precise locations upon a large workpiece.

Referring to FIG. 2, the successive operating stations are shown schematically as a series of substrates are carried in sequence from one station to the next by conveyor tape 1 trained around a pair of pulleys 2 and 3 so that the upper end of tape 1 moves in the direction of the arrow 4 from left to right as viewed in the drawing. Tape loader 5 constitutes the first station and loads the substrates onto tape 1.

At the next station, a dimpler 6 is provided within an array of coining punches to dimple a circular flat area, e.g. about 0.007 inch in diameter, on each of the pads of the substrate. These flat areas are to receive copper balls of the chip when the latter is placed onto the substrate at the subsequent operating stations. The next stations perform a flux dispensing operation whereby a droplet of flux is discharged onto the substrate area including land pads P. The flux dispenser is indicated generally by the reference numeral 9 in FIG. 2. To reduce the flux droplet height, the next operating station comprises a flux flattener generally indicated at 15 in FIG. 2 which functions to emit a jet of compressed air against each of the flux droplets to flatten and spread them. Now that each of the pad configurations has been dimpled and fluxed to receive a chip C, the next operation is to position the latter thereon. For this purpose, there are provided a series of chip placement heads indicated generally at 17 in FIG. 2 and constituting the next stations to which the substrate S is carried by the conveyor tape 1. The number of chip placement heads will correspond to the number of chips C to be positioned upon each of the substrates S since each head 17 positions a chip at a particular location of the substrate. At these placed stations, a continuous feed of chips is provided by a vibratory feeder bowl 19 for pick-up by a vacuum needle 18. Each bowl 19 feeds chips C in sequence to a pick-up location where each chip is picked-up by the lower end of a respective one of vacuum needles 18. In the process of dispensing a chip C, each feeder bowl 19 orientates each chip into an orientation correlated to the desired pattern in which the chips C are to be mounted on the substrate S.

After chip C is picked-up on the lower end of vacuum needle 18 it is annularly rotated about a vertical axis from the original pick-up orientation to the required orientation for proper alignment with the particular land pattern configuration of the substrate at the location thereon in which the chip is to be positioned. For this purpose there is provided a chip orientation sensor indicated generally at 20 in FIG. 2 which contacts the collector balls to determine the quadrant in which the latter is located. Chip placement head 17 is rotably indexed to bring the vacuum needle with chip C thereon to the chip orientation sensor 20. Thereafter chip placement head 17 is again angularly indexed to bring the vacuum needle 18 with chip C thereon to a chip orientator station indicated generally at 21 which rotates the chip on vacuum needle 18 to the desired quadrant orientation corresponding to the land pattern configuration.

After substrates S are carried by tape conveyor 1 from the last of the series of chip placement head 17, the next operating station in the sequence of the chip presence sensor is indicated generally at 22 in FIG. 2. This device tests each substrate S to determine if the required number of chips C had been positioned thereon. Each substrate is thereby characterized as an ACCEPT or REJECT, and this characterization is retained in a memory circuitry of the electrical control system to be described below, until substrate S is carried by conveyor 1 to a rework head indicated generally at 23. This final station may be selectively programmed to remove from tape conveyor 1 either all of the accepted substrates or all of the rejected substrates. Generally, it is programmed to remove all of the rejected substrates so that the latter may be reworked, usually by operators manually positioning chips at the missing locations. The accepted substrates continue on conveyor tape 1 toward its discharge where they are removed by suitable interface apparatus (not shown) and loaded upon a subsequent conveyor for passage through a chip bonding oven (not shown).

Detailed discussion of the aforedescribed line will be only directed to the chip presence sensor 22 in view of its close cooperative interrelationship with the probe sensing means of this invention. Details relative to the design and the construction of the various other components of the aforedescribed line may be found in the aforesaid U.S. application Ser. No. 459,179 which has been incorporated herein by reference thereto as indicated above.

Chip presence detector

As indicated above, after the semiconductor chips C have all been positioned on the substrate at the respective chip positioning stations, the substrate is moved by tape conveyor 1 to the chip presence detector. The construction of the chip presence detector is shown in FIGS. 3, 4 and 5 of the drawings. As shown in these drawings, a vertically movable sensing head 1p is mounted above the conveyor directly over the index position of the substrate S, as clearly shown in FIG. 3. The sensing head 1p has a plurality of longitudinally reciprocal protruding pins or probes 7, which as shown more clearly in FIG. 4 are arranged in the same relative locations as chips on the substrate. Probes 7 are reciprocably mounted for axial movements in a housing assembly 24 suitably secured to a bracket 25 in turn secured by a suitable fastener at the bottom of head 1p. When the sensing head is lowered, the probes 7 are depressed into the head by the respective semiconductor chips on the substrate S. If a chip is missing, one of the probes 7 intended to sense its presence will not be depressed thereby providing a signal to indicate that the substrate is defective. Within the head 1p is incorporated the probe sensor means of this invention which cooperatively incorporates the aforementioned probes 7. Appropriate electrical circuitry is provided to detect with a novel switch assembly associated with the probes in the sensor of this invention, whether or not all the chips are present. When a missing chip is detected, a signal is sent to the subsequent station, which as indicated above, will remove the substrate from the conveyor. In practice, each of the switch units of a unitized planar switch assembly associated with the probes remains closed when the probes are extended. When the probes are retracted by contact with a semiconductor chip properly positioned, the switches are opened, which opening provides a signal that the substrate is complete as to chips. The circuitry is such that a single closed switch will signal the subsequent rework head station to remove the substrate. Also provided on the bottom of head 1p is a plurality of protruding limit pins which extend slightly beyond the chip sensing probes 7 when they are in the extended position. Limit pins 5p provide a reference guide or probes 7 relative to the top surface of the substrate, and also prevent the ends of probes 7 from contacting any flux on top of the module in the event that the thickness of the substrate varies.

The head 1p is mounted for vertical reciprocal movement relative to conveyor 1. Head 1p is mounted on the lower end of reciprocal shaft 6p which is slideably mounted in bearing 7p and 12p, in turn mounted in horizontal frame elements 8p and 11p, respectively. Frame element 8p is rigidly mounted relative to the tape conveyor 1 by upright frame elements 9p and 10p. A compression spring 14p is provided to bias the head 1p and shaft 6p downwardly and arm 15p is pivotally connected at one end to a lug 16p and is pivotally connected at the other end to the upper portion of shaft 6p. Longitudinal movement of rod 17p caused by a cam 18p and cam follower 19p causes reciprocal movement of head 1p. Torque is transmitted from drive shaft (not shown) to shaft 20p whereupon the rotational movement is converted to reciprocal movement by cam 18p and cam follower 19p. The reciprocal movement of shaft 17p is in turn transmitted to shaft 6p and head 1p through arm 15p in abutting engagement with the upper end of shaft 17p. As can be seen, the head 1p is in effect lowered over the module, with the force exerted downwardly being the additive effect of the weight of the head and associated elements, and the biasing force exerted by spring 14p. As would be apparent, the head is not mechanically forced downwardly so that with the arrangement as described, damage or breakage of the elements of the apparatus is not likely in the event that a substrate extends upwardly beyond the anticipated vertical distance, as for example a substrate not seated properly in the tape conveyor belt, or by the presence of a dual chip at a single position due to some malfunction of the line. Further details as to the drive mechanism, design and operation of the chip sensing head may be found in the above indicated U.S. application Ser. No. 459,382 which has been incorporated herein by reference thereto.

Chip presence sensor

A greatly enlarged fragmentary portion of the housing assembly 24 containing the chip sensor is shown in FIG. 6. The housing assembly includes a supporting dielectric plate 26 of suitable insulation material with pilot bores 27 for slideably receiving probe 7 for axial or reciprocal movement therein. However, although the supporting face plate 26 has been indicated to be a dielectric material, it is to be understood that conductive materials may also be employed by the addition of a suitable insulating layer or film on the top surface 28 thereof.

Figure 7:
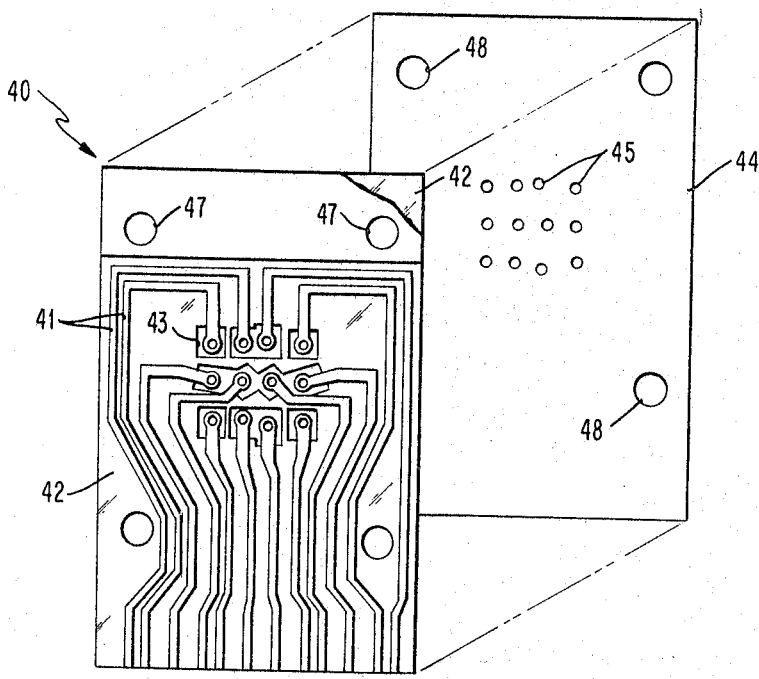
FIG. 7 is an exploded view of the laminate switch contact assembly shown in FIG. 6.

The probes 7 are provided with a reduced body portion 30 to accommodate their passage through suitable openings in the planar laminated multiswitch assembly 31 of this invention for suitable connection into or with an enlarged head portion 32, as by screw threads and the like. This head portion 32 is provided at its underface with an apertured annular sheet of insulation material 33. The head portion 32 includes an upstanding spring guide portion 66 about which is mounted a coil spring 34 which is confined between the head portion 32 and the inner top wall 35 of a housing cover plate 36. The spring 34 is sufficiently compressed so as to yieldingly bias the head portion 32 against the planar laminated assembly 31, and to thus conversely yieldingly maintain probe 7 in projection from the bottom of support plate 26. Also included within the support plate 26 is a recessed seat 37 into which is secured the limit pin 5p which, as indicated above, provides a reference guide for probe 7 relative to the top surface of the substrate so as to position the distal ends of probe 7 at an elevation between the top of the chips and the surface of the substrate. The planar laminated switch assembly comprehended within this invention is shown in exploded form in FIG. 7 and comprises a printed-circuit board 40 provided on its upper surface with a pattern of electrical conductors 41 of resilient electrically conductive spring stock metal, as for example a spring stock copper-beryllium alloy. The circuit board substrate 42 is preferably fabricated of polyethylene terephthalate polymer (such as Du Pont's Mylar) but which however, may be fabricated of any other suitable insulating material such as glass, paper, paper-filled laminate and the like. The pattern of conductors 41 laminated to the top major surface of substrate 42 includes a separate conductor for each probe employed, which in the embodiment shown comprises 12 conductors having apertured spring contact end portions projected as cantilever beams over openings 43 extending through the circuit board support 42. This cantilever extension of the terminal portions of the conductors forms, in view of the resilient spring stock conductor employed, spring contacts which may be yieldably depressed under pressure and spring back upon release of the applied pressure. In a preferred configuration, each of the conductors in the conductor pattern 41 extend to and terminate at an edge of the circuit board 40.

Completing the laminate switch assembly is a bottom or common contact 44 which is disposed in abutment with the other lower major surface of the circuit board support 42. The bottom contact plate 44 may be formed of suitable conductive material such as copper and the like, and which may, if desired also be of resilient spring stock such as the beryllium-copper alloy used for the conductors on the upper major surface of the circuit board support 42. In the preferred form the common contact plate 44 also extends to and terminates at an edge of the circuit board 40 when the two are superimposed together. The termination of the conductors 41 and the common contact plate 44 at the edge of circuit board 52 enables the assembled test fixture to be inserted into a conventional receptacle (not shown) having spring contacts for each of the conductors in the pattern on the top surface of the circuit board and one or more spring contacts for the common contact plane 44 disposed adjacent the bottom major surface of the circuit board 42. Such receptacles were unknown and are commonly referred to as printed-circuit connectors.

Provided in the bottom common contract plate 44 are a plurality of apertures 45 having substantially the same dimensions as the apertures of the terminal portions of the conductors in the conductor pattern 41. In general, the size of the common contact plate apertures 45 is smaller than the opening in the circuit board support openings 43 with the relative dimensions therebetween being sufficiently great so as to permit the conductor end portions, on the upper major surface of circuit board support 42, to be yieldingly deflected downwardly through the circuit board openings into contact with the common contact 44.

Also provided in each of the printed-circuit boards 40 and the common contact 44 are a plurality of locating holes 47 and 48 respectively, so as to enable the planar laminate switch assembly 31 to be mounted on locator pins 49 for precisely locating the planar laminated switch assembly 31 on the housing support plate 26. Such location of the planar laminated switch assembly 31 on the housing support plate 26 which enable precise registration of the common contact aperture 45 with the aperture of the terminal portion of the conductor pattern 41, and also with the pilot bores 27. And to thus enable the reduced portion 30 of probes 7, to pass through the common contact and conductor apertures in spaced relationship therewith.

With the reduced portion 30 of probes 7 passing through the apertures in the terminal contact beam portions of conductors 41 and the apertures of the common contact plate 44, into securement with the enlarged head portion 32, cooperative coaction is effected between the elements under the biasing force of spring 34 and the depression of probe 7 into the housing 24, as by contact with a chip on a substrate in the operative position. Normally with the detector head 1p raised in the upward position, out of any cooperative engagement with a chip mounted substrate, the spring 34 will yieldingly bias the enlarged probe head 32 against the terminal end portions of conductors 41 with sufficient force to yieldingly depress or bend them into closed electrical contact with the common contact plate 44 and thus form a closed circuit with (via a plurality of conductors in cable 55) a corresponding number of electrical sensing or control circuits. With the detector head lowered into cooperative position with a chip mounted substrate workpiece, the limit pins 5p will contact the surface of the substrate workpiece to provide appropriate reference for detection of the chips by probe 7. Upon contact of a chip by a probe, the probe will be depressed into the housing 24 a sufficient distance to relieve the compression force on the terminal portions of the conductors 41 to enable these terminal portions to spring back by themselves and break their connection in the electrical sensing and/or control circuits. As indicated above, absence of a chip as at location 51 on substrate S will cause probe 7 to fail to be depressed into the housing 24 and to maintain the electrical continuity of its conductor 41 in the sensing and/or control circuits.

Fabrication of the printed-circuit board switch assembly is accomplished by the inclusion of an improved method for producing etched printed circuits on an insulating support board originally clad on both sides with a conductive coating. As shown in FIG. 8 a copper clad board 52 consists of a layer of insulating material 53 (such as Du Pont's Mylar) sandwiched between two layers 54 and 55 of a conductive metal. The board 52 is cut to the required size of the preform and the surface suitably cleaned by conventional techniques, such as degreasers, abrasion and the like to condition the conductive layers for application of a photo-resist coating thereon. Both of the exposed surfaces of the conductive layers 54 and 55 are then coated by conventional photoengraving techniques with a photo-resist and exposed by suitable masking to obtain desired image patterns in the photo-resist coating on each major face of the laminate 52. In the particular embodiment employed, the photo-resist on the coated conductive layer 54 was exposed in a pattern defining a plurality of conductors 41A as shown in FIG. 9 together with a plurality of locator holes 47A. For purposes of simplicity, the laminate 52 is shown, by license, in two dual rotated spatial configurations or positions in order to show the photo-resist coated surfaces of both conductive layers 54 and 55. The similar license of expression is employed in other views shown in FIGS. 9B thru 9F.

In turn, the photo-resist coating on the conductive layer 55 is exposed in a pattern defining a plurality of openings 43A, 60 and 61 in conjunction with a plurality of locator holes 48A. Each of the openings 43A, 60 and 61 is cooperatively disposed opposite respective ones of the spring contact terminal portions of the conductors 41A.

The latent images formed in the exposed photo-resist on the circuit board are conventionally developed in a resist developed to form a protective resist pattern on the exposed surfaces of the conductive layers 54 and 55 as shown in FIG. 9B at locations in which the conductive layers are to be retained on the insulating board 53. The board is then immersed in an appropriate eaching solution until all of the conductive layers in the unprotected area have been completely etched away to expose the base insulating material 53. If desired, the resist may be optionally removed at this stage by conventional techniques to expose the retained conductive portions as shown in FIG. 9B. In an important feature of this invention a chemically resisting coating 65, such as polyvinyl chloride, the commercial Warnow Process Plating Resist #145–10–L, and the like is applied over the conductor pattern developed on the conductive layer 54 so as to insure a protective covering over the insulating board exposed through the conductor pattern 41B while leaving the exposed conductor layer 55 free of such covering to retain the portions of the insulating board 53 exposed through the windows or openings 43B, 60B, and 61B to attack by chemical solvents. The coated laminate is then exposed in a suitable solvent (such as sulfuric acid for Du Pont's Mylar polymer circuit board) for a time sufficient to remove the portions of the circuit boards 53A exposed by the windows or openings 43B, 60B, and 61B. After the desired removal of the defined exposed areas of the circuit board 53, the chemical resistant coating is then removed by immersion in a suitable solvent such as methyl ethyl ketone followed by appropriate cleaning and drying of the resultant process laminate. If the resist had been retained, it may also be removed at this time.

After removal of desired portions of the circuit board 53, as indicated above, both major surfaces of the process laminate are then suitably coated with photo-resist, exposed and developed to obtain a protective resist coating over the portions of the conductive layer desired to be retained upon exposure to a suitable etchant for the conductive material. As for example, both sides of the process laminate may be coated with a photo-resist exposed and developed so as to (a) retain a protective resist coating on the conductor pattern 41B developed from the conductive layer 54; and (b) retain a protective resist coating only on the end terminal spring contact portions of conductors 41B exposed on the reverse side of the processed laminate (e.g., conductive layer 55) leaving the conductive layer 55 unprotected in order to effect removal thereof from the circuit board 53.

Figure 9C:
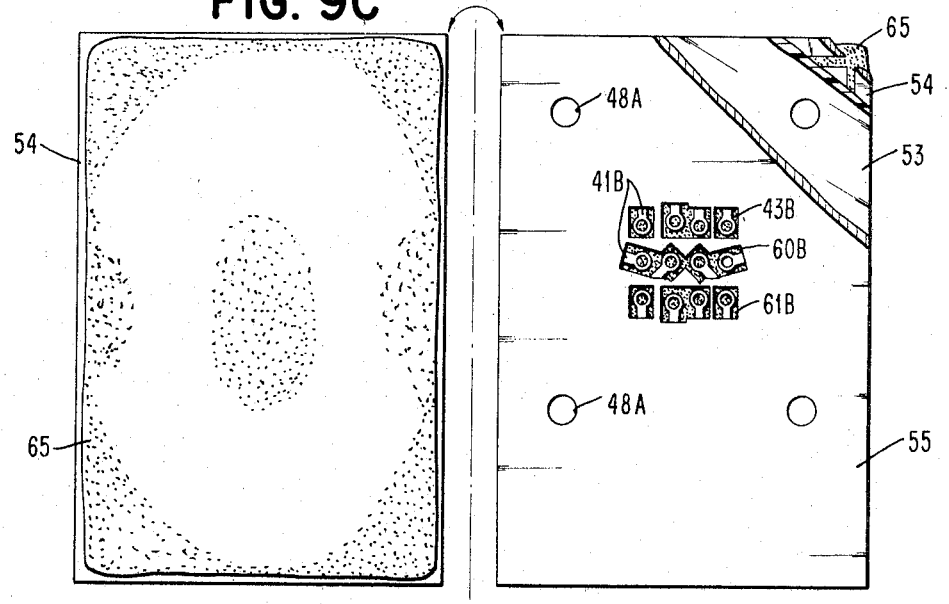
Figure 9D:
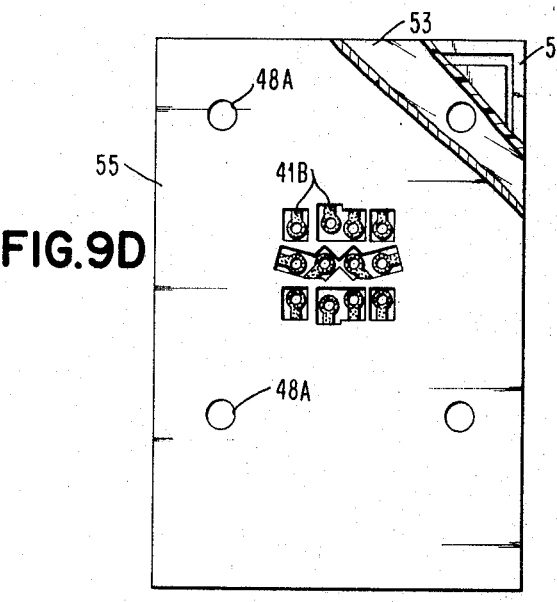
Figure 9E:
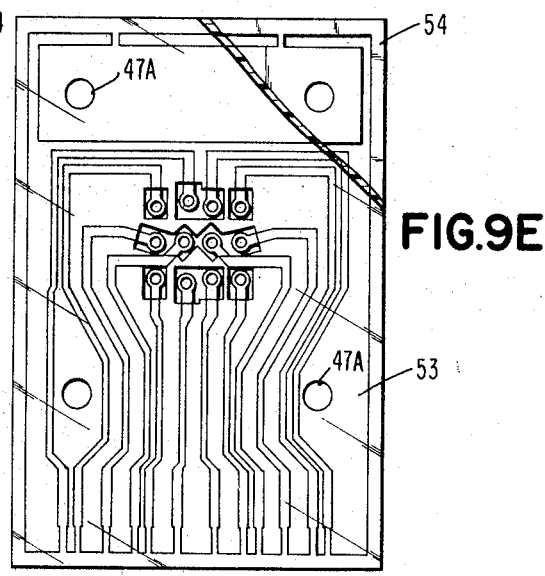
Figure 9F:
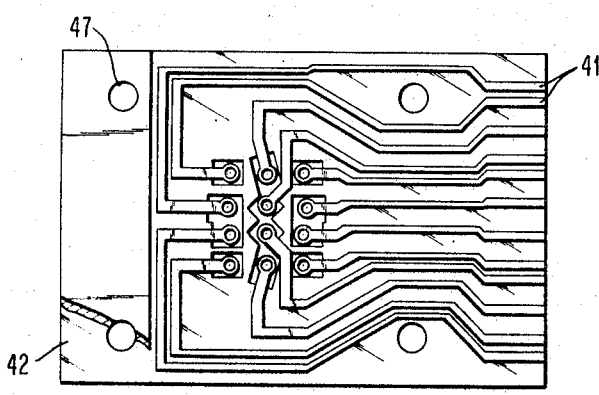

Subsequently the retaining frame surrounding the desired conductive pattern 41B is suitably trimmed away as shown in FIG. 9F to produce desired printed circuit 40 as employed hereinabove in the described planar laminated multiswitch assembly.

In the planar laminated multiswitch contact assembly, the thickness of the insulator support board determines the contact spring deflection of the terminal end portions of the conductors 41 as appropriate 32 is depressed thereon under bias of spring 34. In the particular embodiment described, the circuit board support was about .003 inch thick, clad with a pattern of conductors of about .003 inch thick with the common contact plate being of .062 inch thick. However, it is to be understood that the various component elements of the planar laminated multiswitch contact assembly may vary in thickness depending on the application to which the device is to be put.

Figure 10:
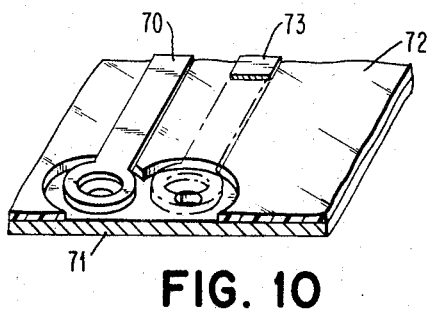
FIG. 10 is a fragmentary perspective view partially in a section illustrating another embodiment of the switch contact assembly of this invention.

FIG. 10 illustrates another modification of the planar laminated multiswitch contact assembly of this invention in which the switch units are fabricated so as to retain a pattern of cladding 70 and 71 on both major opposite surfaces of an insulating support board 72, defining, respectively, a pattern of conductors 73 and a common contact plate 71.

Control and sensing circuits

In order to illustrate the use of the sensing probes of this invention in conjunction with electrical sensing and control circuits, use of the invention will be described in conjunction with the control system described in the above incorporated copending application U.S. Ser. No. 459,382 as described in this copending application and shown and illustrated in FIG. 11, a portion of a logic flow diagram is shown relating to the electrical circuitry for controlling the chip presence sensor 22 and the rework head 23. The logic operations are initiated at 62g by a signal from the system control. The decision as to the detection of a substrate is indicated at 63g (83e, K29, 82e). A negative determination transmits a signal through the line marked NO so as to inhibit the chip sensing operation at 64g. An affirmative determination as 63g is transmitted through the line marked YES and OR function 65g so as to actuate a one revolution clutch of the chip presence sensor 22 at 66g (96e, K55, K31–1 to K30–12 and K31–K42–1). The first decision by the sensor 22 is to determine whether its own sensing contacts are jammed as at 67g. An affirmative determination is transmitted through the line marked YES so as to stop the machine at 68g.

A negative determination indicating that none of the sensing contacts is jammed is transmitted through the line marked NO so that the sensor 22 may perform its main function of sensing for the presence of chips on the substrate as indicated at 69g (88e, 89e, 90e, K31–K42). This operation is controlled by manually selectable program at 70g (99e, 99e–1 to 99e–12) which indicates those chip positions on the substrate which are to be sensed for the presence of chips thereon. In the event that the machine is stopped at 68g, it may be manually restarted and indicated at 71g thereby transmitting a signal to the OR operation at 65g, (85e, K29–2, 86e).

The sensing operation at 72g results in a decision as whether all the chips C are present on the substrate S in those chip locations selected by the program at 70g. The substrate S is thereby characterized as either an ACCEPTED substrate or a REJECTED one. The rework head may be programmed at 72g (98e, K43–2 to K54–2, K56) so as to pick up either no substrates as at 74g, (85e, K29–2, 86e), or all substrates as at 75g (106e–4), or "rejected" substrates as at 76g (105e, 106e–3, K64–2), or "accepted" substrates as at 77g (105e, 106e–2, K56–2).

No information is transmitted from the "no substrates" condition 74g so that, in the event of the selection of this program, the rework head 23 remains inoperative.

The information as to whether all the chips are present at the programmed locations on the substrate, combined with the rework head programmed information at 75g, 76g, 77g is transmitted to the OR operation at 78g (105e, 106e–2, K56–2, K64–2) and this information is then stored for the time required for the sensed substrate to travel from the chip presence sensor 22 to the rework head 23 where the information is finally utilized by the latter. This information storage operation is indicated at 79g, and at 80g (K57 to K61) there is indicated a decision as to whether the information was stored for the required two cycles.

If the determination at 80g (K57, K58, K59, K69, K61) is negative then the "store information" operation at 80g is repeated until the required two cycles is obtained. The affirmative determination that the information was stored for two cycles at 80g is transmitted through the line marked YES to the input of the AND operation at 83g in FIG. 12. Said AND operation 83g has a second input connected to the affirmative determination output marked YES of the CARRIER PRESENT decision at 91g (S1–1). If both decisions at 81g, 91g are affirmative a one-revolution clutch (not shown) in the rework head is actuated at 84g (108e, 109e, K61–2, K65) causing the rework head 23 to remove a substrate S from the conveyor tape 1 and to load the substrate into a carrier as symbolized at 85g.

At 86g (53–1) a decision is made as to whether the rework head 23 succeeded in its task of picking up the substrate S and removing it from the conveyor tape 1. A negative determination is transmitted through the line marked NO to stop the machine at 88g. An affirmative determination is transmitted through the line marked YES to the INDEX CARRIER operation at 87g (S2–1).

This operation transmits a signal to the OR function at 90g which also has inputs from RESTART operations at 89g and 93g. Transmission of a signal through any of these inputs is transmitted through OR function 90g to initiate a logic decision at 91g as to whether a carrier is present to receive the substrate S removed from conveyor tape 1 by rework head 23.

If this determination is affirmative a signal is transmitted through the line marked YES to the AND operations 83g so that the rework head one-revolution clutch will not be actuated at 84g unless a carrier is present to receive the removed substrate S.

If no carrier is present the decision at 91g is negative to transmit a pulse through the line marked NO so as to stop the machine at 92g and thereby transmit a signal to the NOR function at 94g. The latter also receives a signal in response to the machine stopping operation at 88g and also the machine stopping operation shown in FIG. 11 at 68g. If none of these inputs to the NOR function at 94g is energized, the PERMIT TAPE INDEX decision at 95g (113e, K55–2, S1–2, S2–2, S3–2, 114e) is affirmative to transmit a signal on the line marked YES to the system control. However, if any of the inputs to the NOR function 94g is energized, the decision at 95g is negative so as to inhibit the indexing of the conveyor tape at 96g.

As seen in FIG. 13, the normally closed contacts of the chip presence sensor closes a circuit from a power supply 84 to a corresponding one of a plurality of relays or solenoids in the adaptor. Each of the solenoids in adaptor is maintained activated to mechanically open and maintain open a corresponding one of a plurality of normally closed switches in the response switch matrix 82. Referring to this drawing 13 which shows the use of the chip presence sensor of this invention in conjunction with the system of the incorporated U.S. application No. 459,382. As shown therein the chip presence sensor 80 of this invention is shown interconnected through an adaptor 81 to a response switch matrix 82. Upon closure of contacts 82–2, relay K32 is energized to close contacts K32–1.

Referring first to FIG. 13, pulse timing switches 81e and 82e are connected in series with a substrate presence sensor switch 83e located one tape index position before chip presence sensing station 22. Sensor switch 83e is provided with a feeler arm which closes the switch in response to engagement with a substrate S present on conveyor tape 1 at that position. This permits pulse timing switches 81e and 82e to energize a chip sensing one-revolution clutch control relay K29 which is maintained closed through its own contacts K29–1 by pulse timing switch 84e. Relay contacts K29–2 are thereby closed to permit pulse timing switch 85e to energize chip sensing one-revolution cutch solenoid 86e thereby actuating a one-revolution clutch which in turn actuates chip sensing head 22.

The reference numeral 80 indicates generally a chip presence sensor comprising a series of twelve switches 80–1 to 80–12 inclusive, each of which may correspond to a particular chip location of substrate S and which will be opened when its respective feeler arm contacts and senses the presence of a chip C at that location. The left-hand terminals of said switches 80–1 to 80–12 are joined and connected in series with pulse timing switch 87e and their right-hand terminals are connected to a respective one of the solenoids 81–1 to 81–12.

Before the actual chip presence sensing operation, chip presence sensor 80 is first tested to determine if any of the twelve switches 80–1 to 80–12 is accidentally jammed in a closed position. For example, suppose that switch 80–2 is improperly closed before the chip presence sensing operation. In this event, the solenoid is de-energized to close switch contacts 82–2 thereby permitting pulse timing switch 96e to transmit a pulse to energize chip sensor jammed relay K55 held closed by its own contacts K55–1 through a normally closed restart switch 155e. This will stop the machine in a manner to be described below.

Whether the circuitry is sensing for a jam in one of the switches 80–1 to 80–12 or for the presence of chips C on substrate S is determined by chip sensing control relay K30. When the latter is not energized, then the series of twelve double-throw relay contacts K30–1 to K30–12 inclusive will be in the condition shown in the drawing so that when one or more of the twelve normally-open relay contacts K31–1 to K42–1 inclusive is closed due to jamming of one of the switches 80–1 to 80–12, only the chip sensor jammed relay K55 will be energized but none of the chip present relays K43 to K54 inclusive will be energized.

Relays K43 to K54 are energized only when chip presence sensor 80 senses that the corresponding chips C are present on substrate S. This occurs during the chip sensing operation determined by pulse timing switch 88e which energizes chip sensing control relay K30 to actuate all of the double-throw contacts K30–1 to K30–12 inclusive, thereby placing the twelve chip present relays K43 to K54 inclusive in series with the respective relay contacts K31–1 to K42–1 inclusive. The latter close in accordance with energization of the respective relays K31 to K42 inclusive by closure of the respective switches 82–1 to 82–12 in response to the presence of a chip at the respective location on substrate S via the breaking of contact of the respective switches 80–1 to 80–12.

Pulse timing switch 95e thereby transmits a pulse through the closed sets of contacts of the group K31–1 to K42–1 inclusive so as to energize those of the chip present relays K43 to K54 inclusive which correspond to locations on substrate S having chips C present thereon. Relays K43 to K54 inclusive are maintained energized for a longer period of time than the actual duration of the physical sensing operation through their own respective relay contacts K43–1 to K54–1 inclusive by pulse timing switch 97e.

Having sensed the pattern of chips C present on substrate S, it is then necessary to determine whether this pattern is an acceptable one; that is, whether the chips actually present constitute all those that are supposed to be present, or whether one or more chips are missing. For this purpose there is provided a chip sensing program selector shown in FIG. 14 and indicated generally by the reference numeral 99e. This selector comprises a series of twelve switches 99e–1 to 99e–12 inclusive, each adapted when closed to short-circuit a respective one of the twelve normally-open relay contacts K43–2 to K54–2 inclusive, arranged in series between pulse timing switch 98e and accept substrate relay K56. Energization of the latter indicates that the substrate S has thereon the required number of chips C at the sensed location.

Since the printed-circuit pattern on a substrate S may be designed so as to have any number of transistor or diode chips up to a total of twelve in number, chip sensing program selector 99e is set by manually closing those of the twelve switches 99e–1 to 99e–12 which correspond to sensing locations where no chips are to be positioned for the particular printed-circuit pattern, whereas those switches corresponding to locations where chips are to be positioned are left in the open condition shown in the drawing. For example, assuming that it is desired to sense only the presence of chips in the first two positions corresponding to the switches 80–1 to 80–2; that is, to determine the presence of chips designated "No. 1" and "No. 2," then program selector 99E is set by closing all of the ten switches 99e–3 to 99e–12 while switches 99e–1 and 99e–2 are left in the open condition. Therefore the presence of chip No. 1 and chip No. 2 results in the closure of switches 82–1 and 82–2 (via the opening of respective switches 80–1 and 80–2) to energize relays K31 and K32 thereby closing relay contacts K31–1 and K32–1 to permit pulse timing switch 95e to energize relays K43 and K44 through the actuated double-throw relay contacts K30–1 and K30–2 respectively. This causes closure of relay contacts K43–2 and K44–2 in FIG. 14 thereby permitting a pulse from timing switch 98e to flow through these closed contacts and also through the ten closed switches 99e–3 to 99e–12 inclusive, thereby energizing accept substrate relay K56. If chip No. 1 and/or chip No. 2 is not present during the sensing operation, then switch 99e–1 and/or 99e–2 remains open (by failure of one of switches 80–1 and/or 80–2 to open) so that relay K31 and/or K32 is not energized thereby preventing the energization of relay K43 and/or relay K44. This prevents the closure of contacts K43–2 and/or contacts K44–2 thereby opening the series path between pulse timing switch 98e and accept substrate relay K56. Therefore relay K56 is not energized in the event that one or both of the two sensed chips is missing.

Once it is determined that a particular substrate is accepted or rejected by energization or nonenergization of accept substrate relay K56, the next consideration is whether rework output head 23 is programmed so as to pick up from the tape either all rejected substrates, or all accepted substrates, or all substrates or no substrates. Those substrates picked up by rework head 23 are placed in tray carriers whereas those substrates not so picked up continue on conveyor tape 1 toward the discharge end of the latter. Generally, rework head 23 is programmed to remove all rejected substrates from tape 1 and to permit the accepted substrates to continue on tape 1 toward the next apparatus which is usually an oven (not shown) which permanently joins chip balls B to the substrate land pads P on which they have been placed by the subject chip positioning machine.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A sensor for detecting the presence of object comprising:
   (A) a support means;
   (B) an electrically conductive common sheet supported on said support means;
   (C) a sheet of electrically insulating material overlying said common sheet;
   (D) a resilient electrical conductor of spring stock material superimposed on said sheet of insulating material including a contact beam portion thereof projecting in cantilever fashion over said common sheet;
   (E) contact closure means positioned above and adjacent said projecting contact portion;
   (F) bias means for yieldingly urging said contact closure means against said contact portion for yieldingly clamping said contact beam portion in electrical contact with said common sheet;
   (G) axially movable probe means operatively connected to said closure means for common movement therewith with said probe means adapted when depressed, to force said closure means in movement against said bias means a sufficient distance to permit said projecting beam contact portion to deflect in open circuit from said common sheet; and
   (H) means for positioning the end of said probe means at a level below the top of said object whereby the presence thereby will cause said probe means to be axially moved thereby depressing said closure means against said bias means to permit said projecting contact beam portion to deflect in open circuit from said common sheet.

2. A sensor for detecting the presence of components mounted on a surface of a workpiece comprising:
   (A) at least one probe means corresponding in number to the number of said components to be sensed with said probe means being axially movable in a direction substantially normal to said workpiece surface;
   (B) a sheet of electrically insulating material having opposite major surfaces and at least one opening therebetween circumscribing a said probe means;
   (C) a pattern of resilient electrical conductors corresponding in number to said probe means with each conductor adapted for cooperating relationship with a respective one of said probe means and including a contact beam portion projecting in cantilever relationship over said opening;
   (D) electrical contact means adjacent the other of said surfaces and having a portion thereof projecting over said opening in spaced relationship to said contact beam portion with said contact means being adapted to form with each said conductor a separate and corresponding electrical detecting circuit for said components;
   (E) contact closure means operatively connected to said probe means for corresponding movement therewith and disposed adjacent a said conductor portion for yieldingly urging said contact beam portion into electrical contact with said contact means;
   (F) bias means for yieldingly urging said closure means to depress said contact beam portion in said electrical contact with said contact means; and
   (G) means for positioning the end of said probe means at a level intermediate said workpiece surface and the top of said component mounted thereon.

3. The sensor of claim 2 including a support means adjacent said contact means and including a guide bore opposite each said contact beam conductor portion and said opening and adapted for housing said probe means in projecting relationship therefrom.

4. The sensor of claim 3 including apertures in each said conductor portion and said contact means for spaced passage of said probe means therethrough into its operative connection with said closure means.

5. The sensor of claim 4 including a backing means mounted on said support means and adapted to confine said bias means in its said cooperative relationship with said contact closure means.

6. The sensor of claim 5 including a projection on said contact closure means extending toward said backing means in spaced relationship therewith, and adapted to limit the movement of said probe means.

7. The sensor of claim 6 wherein said bias means comprises a coil spring mounted about said projection of said contact closure means.

8. The sensor of claim 2 wherein said electrical conductor comprises a beryllium copper spring stock alloy.

9. The sensor of claim 8 wherein said sheet of insulating material comprises a polyethylene terephthlate polymer.

10. A sensor for detecting the presence of chips mounted on a printed-circuit substrate comprising:
    (A) at least one probe means corresponding in number to the number of chips mounted on said substrate with said probe means axially movable in the direction substantially normal to the surface of said substrate;
    (B) a sheet of electrically insulating material having opposite major surfaces and at least one opening therebetween circumscribing said probe means;
    (C) a pattern of electrical conductors of spring stock alloy coated on one of said surfaces corresponding in number to said probe means with each conductor adapted for a cooperating relationship with a respective one of said probe means and each said conductor including a free spring beam portion projecting in cantilever relationship over the said opening;
    (D) an electrical contact means adjacent the other of said surfaces and having a portion thereof extending over said opening in spaced relationship to said conductor beam portion, said contact means being adapted to form with each said conductor a separate and corresponding electrical detecting circuit for sensing the presence of a said chip;
    (E) contact closure means operatively connected to said probe means for corresponding movement therewith and disposed adjacent a said conductor beam portion for yieldingly depressing said conductor beam portion into electrical contact with said contact means;
    (F) bias means for yieldingly urging said closure means to depress said conductor portion in said electrical contact with said contact means; and
    (G) means for positioning the end of said probe means at a level intermediate said surface of said substrate and the top of said chip mounted thereon.

11. The sensor of claim 10 including a support means adjacent said contact means and including a guide bore opposite each said conductor beam portion and said opening, and adapted for housing said probe means in projecting relationship externally therefrom.

12. The sensor of claim 11 including registered apertures in each said conductor portion and said contact means for spaced passage of said probe means therethrough into its said operative connection with said closure means.

13. The sensor of claim 12 including a backing means mounted on said support means and adapted to confine said bias means in its said cooperating relationship with said contact closure means.

14. The sensor of claim 13 including a a projection on said contact closure means extending toward said backing means in spaced relationship therewith, and adapted to limit the movement of said probe means.

15. The sensor of claim 14 wherein said bias means comprises a coil spring mounted about said projection of said contact closure means.

16. The sensor of claim 10 wherein said conductors comprises a beryllium-copper spring stock alloy.

17. The sensor of claim 16 wherein said sheet of insulating material is a polyethylene terephthlate polymer.

18. A sensor for detecting the presence of an object comprising
- (A) an insulating support comprised of a layer of dielectric material;
- (B) a first electrically conductive contact member overlying one of a pair of opposite sides of said support;
- (C) a second electrically conductive contact member overlying the other of said pair of opposite sides of said support; with
- (D) said first and second contact members having respective contact portions projecting in extension beyond an edge of said support in opposed relationship with each other;
- (E) means for clamping and separating said contact portions in, respectively
  - (a) an electrical contact condition and
  - (b) an electrical open circuit condition relative to each other;
- (F) means for connecting said contact members to an electrical circuit for detecting a change in said conditions; and
- (G) probe means for effecting a change in said conditions upon contact with said object.

19. A sensor for detecting the presence of an object comprising
- (A) an insulating support comprised of a layer of dielectric material;
- (B) a first electrically conductive contact member overlying one of a pair of opposite sides of said support;
- (C) a second electrically conductive contact member overlying the other of said pair of opposite sides of said support; with
- (D) said members having respective contact portions projecting in extension beyond an edge of said support;
- (E) means for yieldingly clamping said contact portions in electrical contact with each other;
- (F) means for connecting said contact members to an electrical circuit for indicating the separation of said contact portions into an open electrical circuit relative to each other; and
- (G) probe means for separating said contact portions upon contact with said object.

References Cited

UNITED STATES PATENTS 2,854,538  9/1958  Bergman _____ 200—61.41

OTHER REFERENCES

IBM Technical Disclosure Bulletin, "Semiconductor Chip Sensing Device," by L. D. Lipschutz, vol. 9, No. 1, June 1966, pp. 100–101.

ROBERT K. SCHAEFER, Primary Examiner

M. GINSBURG, Assistant Examiner

U.S. Cl. X.R.

156—3